(12) United States Patent
Dussmann et al.

(10) Patent No.: US 10,727,931 B2
(45) Date of Patent: *Jul. 28, 2020

(54) REPEATER SYSTEM AND METHOD

(71) Applicant: Andrew Wireless Systems GmbH, Buchdorf (DE)

(72) Inventors: Alfons Dussmann, Gansheim (DE); Thomas Kummetz, Kissing (DE); Stefan Eisenwinter, Buchdorf (DE)

(73) Assignee: Andrew Wireless Systems GmbH, Buchdorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/972,022

(22) Filed: May 4, 2018

(65) Prior Publication Data

US 2018/0254821 A1   Sep. 6, 2018

Related U.S. Application Data

(63) Continuation of application No. 14/898,712, filed as application No. PCT/IB2014/062297 on Jun. 17, 2014.

(30) Foreign Application Priority Data

Jun. 25, 2013 (EP) .................... 13173568

(51) Int. Cl.
*H04B 7/155* (2006.01)
*H04W 72/04* (2009.01)
(Continued)

(52) U.S. Cl.
CPC .... *H04B 7/15507* (2013.01); *H04W 72/0406* (2013.01); *H04W 16/14* (2013.01); *H04W 84/005* (2013.01); *H04W 84/047* (2013.01)

(58) Field of Classification Search
CPC .......... H04B 7/15507; H04W 72/0406; H04W 16/14; H04W 84/047; H04W 84/005
See application file for complete search history.

(56) References Cited

U.S. PATENT DOCUMENTS

2002/0077151 A1   6/2002   Matthews et al.
2009/0077444 A1   3/2009   Qi et al.
(Continued)

FOREIGN PATENT DOCUMENTS

EP   1143641 A1   10/2001
EP   1890399 A1   2/2008
(Continued)

OTHER PUBLICATIONS

U.S. Patent and Trademark Office, "Final Office Action", U.S. Appl. No. 14/898,712, dated Nov. 28, 2018, pp. 1-27, Published: US.
(Continued)

*Primary Examiner* — Jae Y Lee
(74) *Attorney, Agent, or Firm* — Fogg & Powers LLC

(57) ABSTRACT

Repeater systems and methods are disclosed. In one embodiment, a repeater system located within a coverage area comprises: a host configured to combine multiple downlink signals from multiple communication sources located outside the coverage area into a first combined downlink signal; at least one remote coupled to the host and configured to transmit the first combined downlink signal as a second downlink RF communication signal to terminals within the coverage area. The at least one remote is configured to produce a combined uplink signal from multiple uplink signals received through multiple communication links from the terminals, and configured to forward the combined uplink signal to the host. The host produces multiple signals from the combined uplink signal for transmission to the multiple communication sources, wherein a first of the plurality of terminals communicates with a different one of
(Continued)

Figure 1:
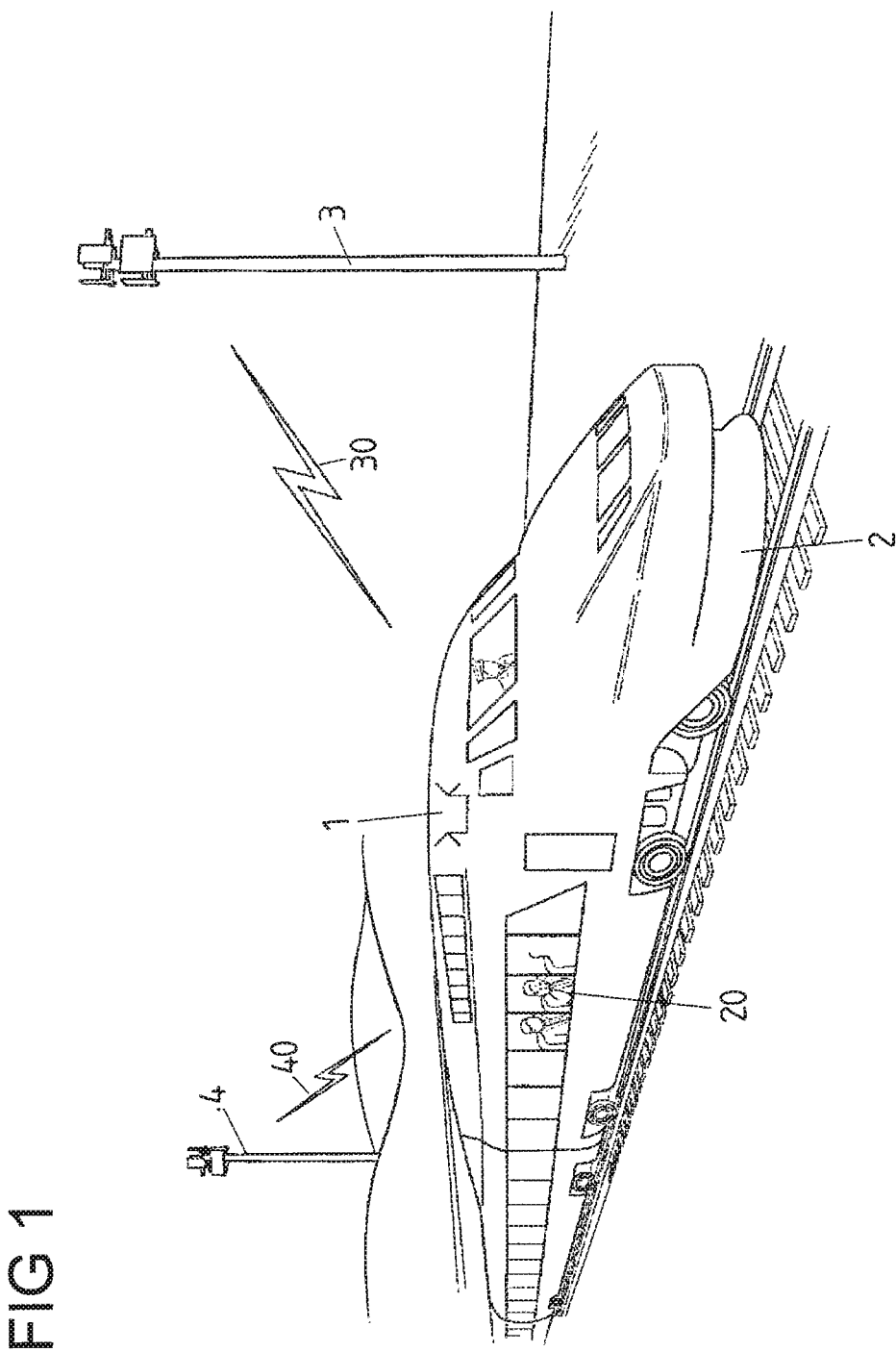

the multiple communication sources than a second of the plurality of terminals.

20 Claims, 5 Drawing Sheets

(51) Int. Cl.
*H04W 16/14* (2009.01)
*H04W 84/00* (2009.01)
*H04W 84/04* (2009.01)

(56) References Cited

U.S. PATENT DOCUMENTS

| | | | |
|---|---|---|---|
| 2011/0090879 | A1 | 4/2011 | Hamiti et al. |
| 2011/0158295 | A1 | 6/2011 | Shiizaki |
| 2012/0176962 | A1 | 7/2012 | Kimura |
| 2014/0045491 | A1 | 2/2014 | Phan et al. |
| 2014/0204832 | A1 | 7/2014 | Phan et al. |
| 2015/0131618 | A1 | 5/2015 | Chen |
| 2016/0134357 | A1 | 5/2016 | Dussmann et al. |

FOREIGN PATENT DOCUMENTS

| | | | | |
|---|---|---|---|---|
| EP | 2472740 | A1 | 7/2012 | |
| EP | 2496045 | A2 | 9/2012 | |
| EP | 2501200 | A1 | 9/2012 | |
| WO | 2006033094 | A2 | 3/2006 | |
| WO | 2009007778 | A1 | 1/2009 | |
| WO | WO 2009/007778 | * | 1/2009 | .............. H04B 7/00 |
| WO | 2010105210 | A2 | 9/2010 | |
| WO | 2012136253 | A1 | 10/2012 | |
| WO | 2012171585 | A1 | 12/2012 | |
| WO | WO 2012/171585 | * | 12/2012 | .............. H04W 8/26 |

OTHER PUBLICATIONS

U.S. Patent and Trademark Office, "Office Action"; U.S. Appl. No. 14/898,712; dated Jun. 8, 2018; pp. 1-31; Published: US.

U.S. Patent and Trademark Office, "Notice of Allowance", U.S. Appl. No. 14/898,712, dated Mar. 13, 2019, pp. 1-7, Published: US.

European Patent Office, "Extended European Search Report from EP Application No. 13173568.0 dated Jan. 29, 2014", From Foreign Counterpart of U.S. Appl. No. 14/898,712; pp. 1-6; Published in EP.

European Patent Office, "Extended European Search Report from EP Application No. 17196838.1 dated Dec. 6, 2017", from Foreign Counterpart of U.S. Appl. No. 14/898,712; pp. 1-10; Published in EP.

European Patent Office, "Office Action from EP Application No. 13173568.0 dated Aug. 23, 2016", From Foreign counterpart of U.S. Appl. No. 14/898,712; pp. 1-8; Published in EP.

International Searching Authority, "International Search Report and Written Opinion from PCT Application No. PCT/IB2014/062297 dated Aug. 13, 2014", From PCT Counterpart of U.S. Appl. No. 14/898,712; pp. 1-10; Published in WO.

State Intellectual Property Office of the People's Republic of China, "First Office Action for CN Application No. 201480036000.5", Foreign Counterpart to U.S. Appl. No. 14/898,712, dated Apr. 3, 2018, pp. 1-22, Published in: CN.

U.S. Patent and Trademark Office, "Advisory Action dated Nov. 1, 2017", from U.S. Appl. No. 14/898,712; pp. 1-3; Published in US.

U.S. Patent and Trademark Office, "Final Office Action dated Sep. 14, 2017", from U.S. Appl. No. 14/898,712; pp. 1-27; Published in US.

U.S. Patent and Trademark Office, "Notice of Allowability dated Feb. 5, 2018", From U.S. Appl. No. 14/898,712; pp. 1-11; Published in US.

U.S. Patent and Trademark Office, "Notice of Allowance dated Jan. 10, 2018", from U.S. Appl. No. 14/898,712; pp. 1-9; Published in US.

U.S. Patent and Trademark Office, "Office Action dated Apr. 6, 2017" From U.S. Appl. No. 14/898,712; pp. 1-35; Published in US.

European Patent Office, "Communication pursuant to Article 94(3) from EP Application No. 17196838.1", from Foreign Counterpart to U.S. Appl. No. 14/898,712, dated Jan. 28, 2020, pp. 1-6, Published: EP.

* cited by examiner

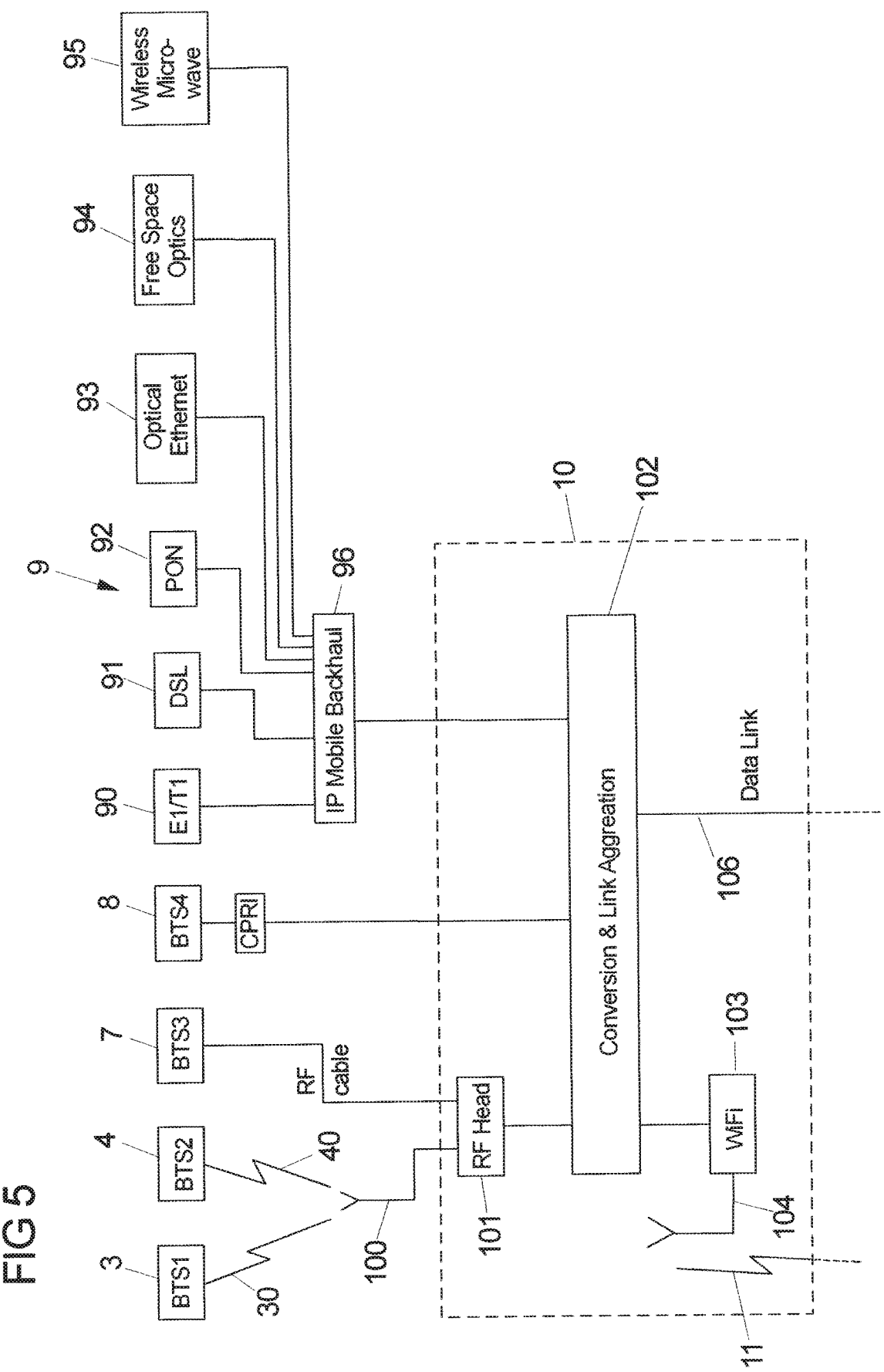

REPEATER SYSTEM AND METHOD

CROSS-REFERENCE TO RELATED APPLICATIONS

This application is a Continuation Application of U.S. patent application Ser. No. 14/898,712 titled "REPEATER SYSTEM AND METHOD", which is a National Stage 371 Application of International Application No. PCT/IB2014/062297 titled "REPEATER SYSTEM AND METHOD" filed Jun. 17, 2014, which claims the benefit of and priority to European Patent Application No. 13173568.0, filed Jun. 25, 2013 and titled "REPEATER SYSTEM", the contents of each of which are incorporated herein by reference.

DESCRIPTION

The invention relates to a repeater system according to the preamble of claim 1 and to a method for operating a repeater system.

A repeater system of this kind comprises a front end section and a back end section. The front end section herein is constituted to, in a downlink direction, receive signals from at least one communication source located outside of a coverage area of the repeater system and to, in an uplink direction, transmit signals to the at least one communication source. The back end section in turn is constituted to, in the downlink direction, transmit an RF communication signal into the coverage area and to, in the uplink direction, receive an RF communication signal out of the coverage area.

A repeater system of this kind may for example be installed in a mobile environment such as a train, a plane, a ship, a bus or the like to provide coverage on the inside of the mobile environment. A repeater system of this kind may also be installed in a stationary environment which is, at least to some extent, shielded from the outside, such as a building, a tunnel or the like. The repeater system in this case provides coverage on the inside of the shielded environment.

A conventional repeater system, as it is for example known from EP 1 109 332 A2, serves to repeat radial frequency (RF) signals to for example provide coverage in an isolated or shielded environment or to improve coverage in areas in which the signal strength is weak and/or dedicated bands, sub-bands or carriers shall be provided only. For this purpose, the digital repeater of EP 1 109 332 A2, in a downlink direction, down-converts a received analog RF signal and digitizes the RF signal in order to process the digitized RF signal in the digital baseband. The processed digitized RF signal is then converted into an analog signal, is up-converted and amplified and transmitted via a coverage antenna into the coverage area in which coverage is to be provided. The processing in the uplink direction takes place in an analogous fashion including a digital baseband processing and a power amplification for transmission to an outside communication source, for example a base station.

Such repeater system, as it is for example known from EP 1 109 332 A2, is transparent for communication signals in that the RF signals output to the coverage area equal the RF signals received from an outside communication source (despite an amplification).

This has the effect—especially when such repeater systems are used in a moving environment such as a train, a ship, a plane or the like—that a (mobile) terminal in the coverage area having established a communication link to an outside communication source via the repeater system must perform a hand-over operation if the signal strength of the communication link becomes weak, i.e. the signal-to-noise-and-interference ratio (SNIR) of that communication link becomes small.

Further, a user of a terminal conventionally has subscribed for services of a signal operator such that he is bound to the services offered by that operator. In case the repeater system (for example including a distributed antenna system for providing distributed coverage in the coverage area) does not belong to that operator and hence does not provide coverage for the services provided by that operator, the user potentially must access the services of another operator by roaming, which may be limited and at the same time expensive.

It is an object of the instant invention to provide a repeater system and a method for operating a repeater system which may provide an approved coverage in a coverage area with the potential of high data rates for communication links in that coverage area.

This object is achieved by means of a repeater system comprising the features of claim 1.

Specifically, within a repeater system it is provided that
  in the downlink direction the front end section is constituted to combine multiple signals from multiple communication sources into a combined signal and to transmit the combined signal to the back end section, wherein the back end section is constituted to produce, from the combined signal, the RF communication signal for transmission into the coverage area and
  in the uplink direction the back end section is constituted to produce, from a received RF communication signal, a combined signal, wherein the front end section is constituted to produce multiple signals from the combined signal received from the back end section for transmission to the multiple communication sources.

The repeater system hence comprises a front end section and a back end section. In the downlink direction, the front end section combines signals that are received from outside communication sources into a combined signal. Hence, multiple communication links established between outside communication sources and the front end section are combined (aggregated) to a single combined signal using a link aggregation scheme. The combined signal is then transmitted to the back end section, and the back end section produces from the combined signal a common RF communication signal which is transmitted into the coverage area for providing coverage in that coverage area.

In the uplink direction, in turn, the back end section produces a combined signal from an RF communication signal received out of the coverage area. The received RF communication signal herein may be constituted by multiple communication links between terminals located in the coverage area and the back end section. The combined signal is then forwarded to the front end section, which produces signals out of the combined signals for transmission to the outside communication sources.

The front end section may for example, in one embodiment, comprise an RF processing unit together with a conversion and link aggregation unit for combining the multiple signals from the multiple communication sources into the combined signal. The RF processing unit together with the conversion and link aggregation unit herein, in the downlink direction, performs a conversion of signals received from the outside communication sources (for example a demodulation) and combines several communication links into a single, combined link. Within the combined signal the data of the single communication links between the front end section and the outside communication sources are contained and are transmitted in a data stream to the back end section for further processing and transmission into the coverage area. Vice versa, in the uplink direction, the RF processing unit together with the conversion and link aggregation unit produces multiple signals and modulates them for transmission to the multiple communication sources.

The RF processing unit together with the conversion and link aggregation unit may, in one embodiment, be operable to equalize the multiple signals received from the multiple communication sources in the downlink direction. Since communication links between the outside communication sources and the front end section may have a different, varying link quality (signal strength, SNIR), the equalization is performed to equalize the communication links and, hence, to bring them to a comparable level of signal strength. Such equalized communication links may then in an easy manner be combined (aggregated) to form the combined signal for a transmission to the back end section.

In the uplink direction, in turn, the RF processing unit together with the conversion and link aggregation unit may individually gain adjust the multiple signals for transmission to the multiple communication sources to take into account different distances to different communication sources. For this, settings of a previously performed equalization may be stored such that an individual gain adjust for individual communication sources may be carried out based on previously obtained equalization information.

In one embodiment, the front end section is constituted as a host unit and the back end section is constituted by one or multiple remote units remote from the host unit. The front end section hence may be placed at a central location, for example on a train, a plane, a ship, a bus or the like or on a building or a tunnel. The back end section with its multiple remote units in turn may be distributed over the coverage area and hence may be placed at different locations throughout the coverage area, for example throughout a train or a building. By means of such distributed remote units hence a distributed coverage may be provided.

The communication between the front end section and the back end section may be established in different ways. For example, the host unit of the front end section may communicate with the remote units of the back end section via wireless communication connections, for example via WiFi connections. Instead of a wireless communication connection, also wire line communication connections could be used, hence connecting the host unit of the front end section to one or multiple remote units of the back end section making use of a wire line, for example copper cables or an optical fiber. Via the communication connections the combined signal is then transmitted to and received from the back end section.

The back end section, in the downlink direction, may be operable to modulate the combined signal according to at least one modulation scheme to produce the RF communication signal for a transmission into the coverage area. The back end section hence modulates the data stream obtained by means of the combined signal according to one or multiple modulation schemes. For this, the back end section may comprise a number of different (logical) base stations, each of which is constituted to modulate a portion of the data stream according to a particular modulation scheme for transmission into the coverage area. Each (logical) base station hence provides coverage in the coverage area for a particular modulation scheme (e.g. GSM, 3G, LTE or the like).

Vice versa, in the uplink direction the back end section may be operable to demodulate a received RF communication signal to produce a combined signal for transmission to the front end section.

The back end section, in one embodiment, further may comprise a multiplexer for multiplexing, in the downlink direction, modulated signals produced from the combined signals to form the RF communication signal for a transmission into the coverage area. The multiplexer hence forms a common communication signal, which may be transmitted via an appropriate antenna or antenna system, for example a distributed antenna system or a so called leaky feeder, into the coverage area.

The operation in the uplink direction essentially works in an analogous fashion. A common communication signal received out of the coverage area is de-multiplexed by means of a de-multiplexer and led to the (logical) base stations of the back end section, in which a demodulation takes place. The demodulated signals are then combined to form a combined signal and are forwarded to the front end section, in which signals for a transmission to the outside communication sources are produced.

In one embodiment, the front end section is operable to communicate with the at least one communication source via a mobile communication scheme, such as GSM, GPRS, 3G, HSPA, HSPA+, LTE or WiFi. The front end section hence communicates with the outside communication sources via an air interface making use of a known mobile communication scheme applying a particular, standardized modulation.

In addition or alternatively, the front end section may also be operable to communicate with one or multiple outside communication sources via a backhaul. Such backhaul may be, but is not limited to, an IP mobile backhaul via for example copper cables using traditional E1/T1 services or using DSL services, a passive optical network (PON), an active optical Ethernet, a fixed wireless (i.e. a fixed wireless connection between two locations employing a radio or other wireless link such as a laser bridge), free-space-optical communication (FSO), radiofrequency via an air interface, radiofrequency directly out of a base station, or any other digital base station interfaces like CPRI.

A modulation scheme employed for a communication link between an outside communication source and the front end section herein may be different than a modulation scheme employed for the RF communication signal transmitted to and received from the coverage area. The back end section may communicate with terminals located in the coverage area for example via the air (so called air interface). A modulation scheme employed for producing the common RF communication signal may for example adhere to the GSM, GPRS, 3G, HSPA, HSPA+, LTE or WiFi standard.

In one embodiment, the signals received from and transmitted to the outside communication sources and the RF communication signal transmitted into and received out of the coverage area use different frequency bands. The communication links between the front end section and the outside communication sources and the communication signal transmitted from the back end section to terminals located in the coverage area hence are distinct in their frequency bands, such that interference of signals of the communication links between the front end section and the outside communication sources with communication signals within the coverage area is avoided or at least kept to a minimum.

In principle it however is also possible that the communication links between the front end section and the outside communication sources and the common RF communication signal transmitted by the back end section into the coverage area at least partially use one or multiple common frequency bands. In that case, if the coverage area lies within a shielded, isolated environment, there may be small or no interference between the outside communication links and communication links in the coverage area. If the coverage area however does not lie in an isolated, shielded environment, it should be made sure that the signal strength of signals transmitted into the coverage area by means of the back end section is limited such that the RF communication signal transmitted into the coverage area does not interfere with the outside signals. This in general does not pose a problem since for example passengers in a passenger train or another moving environment are seated close to antennas of for example a distributed antenna system or close to leaky feeder cable, such that a communication signal having limited signal strength generally is sufficient.

The object furthermore is achieved by means of a method for operating a repeater system. The repeater system herein comprises:
- a front end section which, in a downlink direction, receives signals from at least one communication source located outside of a coverage area of the repeater system and, in an uplink direction, transmits signals to the at least one communication source and
- a back end section which, in the downlink direction, transmits an RF communication signal into the coverage area and, in the uplink direction, receives an RF communication signal out of the coverage area.

Herein it is provided that
in the downlink direction the front end section combines multiple signals from multiple communication sources into a combined signal and transmits the combined signal to the back end section, wherein the back end section produces, from the combined signal, the RF communication signal for a transmission into the coverage area and
in the uplink direction the back end section produces, from a received RF communication signal, a combined signal and the front end section produces multiple signals from the combined signal received from the back end section for a transmission to the multiple communication sources.

The advantages and advantageous embodiments described above with regard to the repeater system equally are applicable also to the method for operating the repeater system, such that it shall be referred to the above.

By means of the repeater system a local roaming cell corresponding to the coverage area is provided for obtaining coverage in the coverage area. Herein, instead of retransmitting signals into the coverage area of the same kind as received from outside communication sources, an available capacity from communication links with outside communication sources is collected and summed up to produce a common RF communication signal for transmission into the coverage area. This common RF communication signal may be distributed in the coverage area for example by a distributed antenna system or by a leaky feeder or by multiple remote units each comprising an antenna.

Such (small) local roaming cells may for example be used in moveable environments, such as trains, planes, ships, busses or the like or in stationary environments, such as buildings (malls, campuses, office buildings etc.) or tunnels or the like.

By providing such a local roaming cell base band, intermediate frequency band and radio frequency band signals may be combined to a common RF communication signal. Such common RF communication signal can then be used to provide coverage in one or multiple roaming cells which are somehow shielded from outside communication sources.

By means of such approach a homogeneous data rate for users in the local roaming cell may be provided. In particular, users having subscribed to services of an operator are not bound to the backhaul performance of such operator, but may obtain an improved data rate due to the link aggregation leading to a combining of communication links of multiple operators.

Further, within the local roaming cell advanced modulation schemes may be employed and the full available bandwidth may be used, allowing for high data rates in the local roaming cell.

In addition, because a terminal located in the coverage area establishes a communication link only to the repeater system, which then communicates with outside communication sources, the terminal must not perform a handover. If a handover for a particular communication link between an outside communication source and the repeater system is required, a terminal in general will not notice, because the hand over solely takes place between the front end section of the repeater system and outside communication sources.

Figure 2:
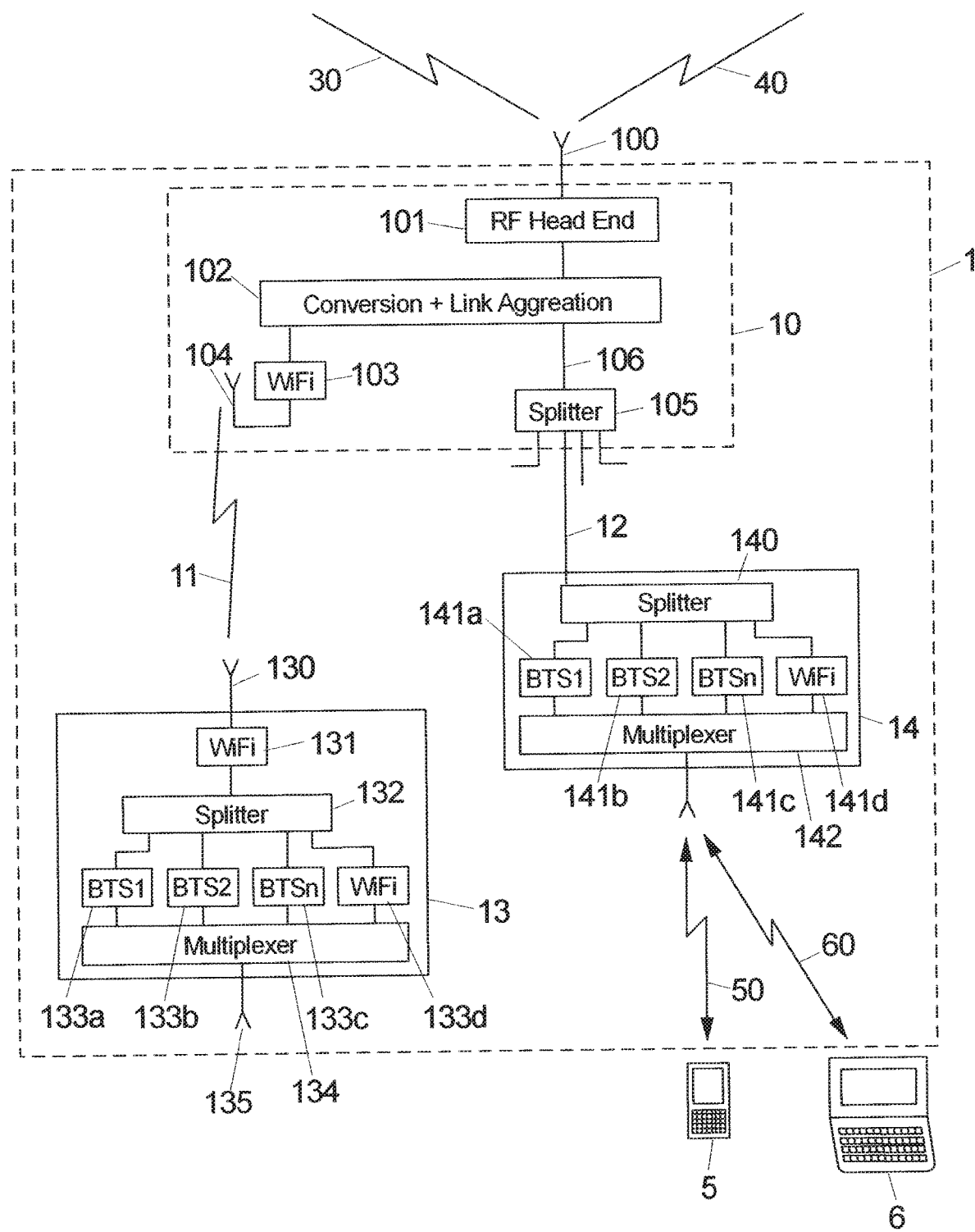
Figure 3A:
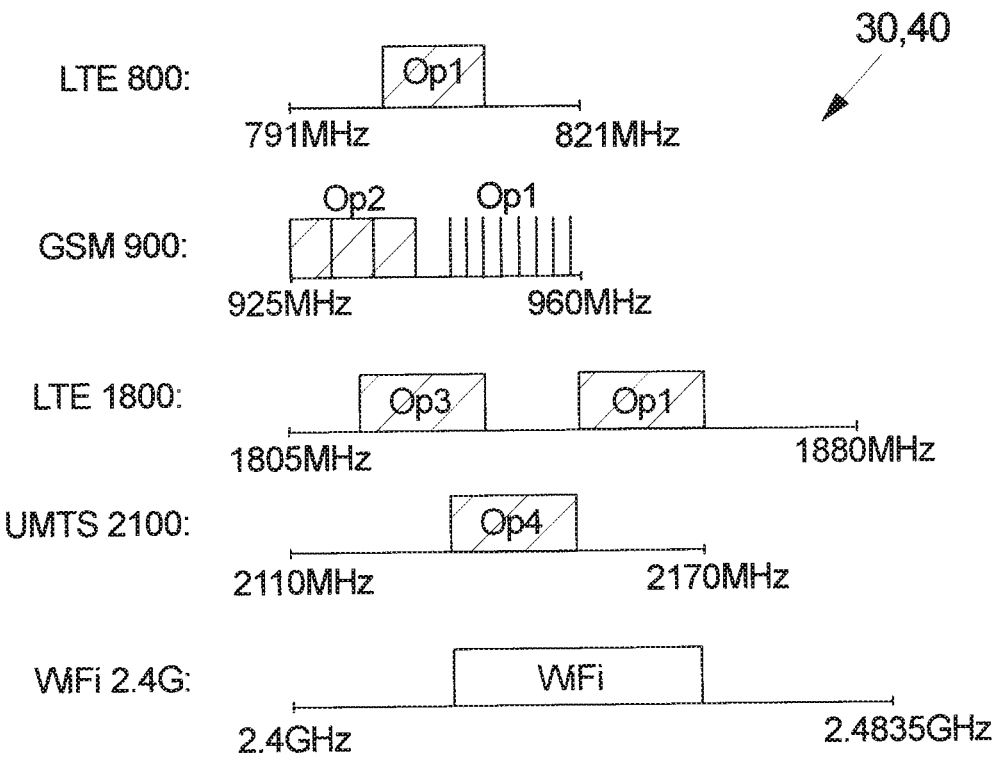
Figure 3B:
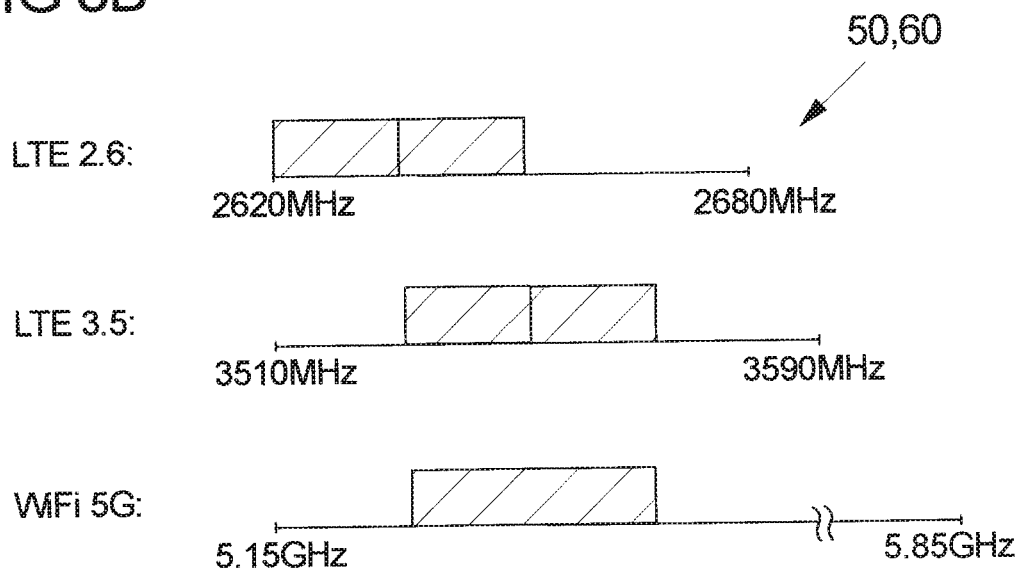
Figure 4:
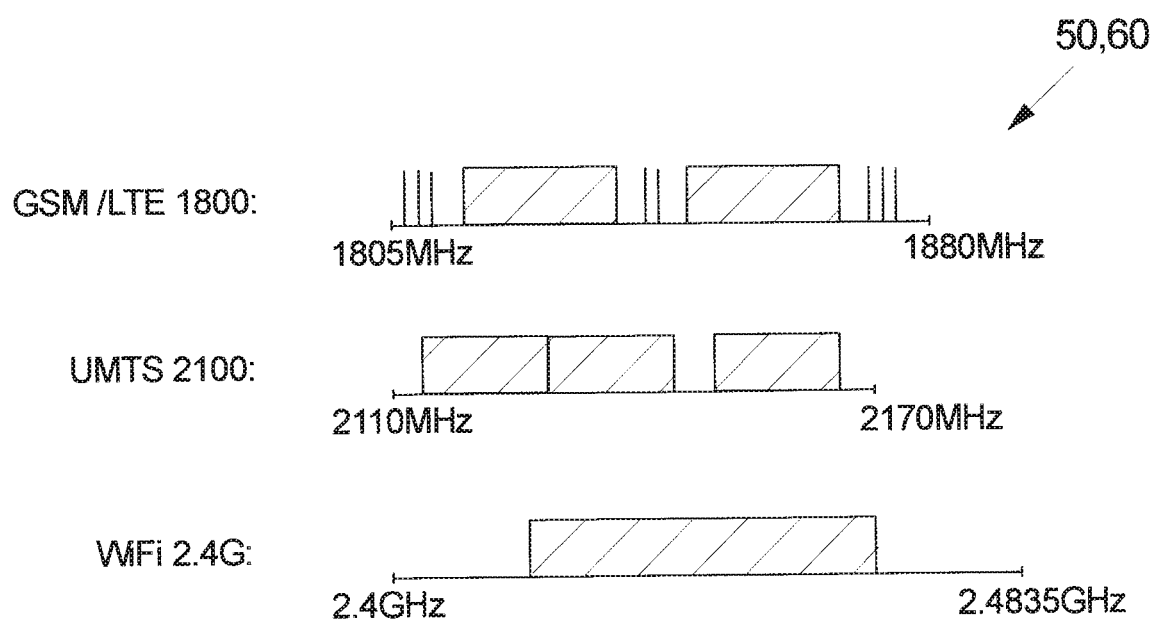

The idea underlying the invention shall subsequently be described in more detail with respect to the embodiments shown in the Figures. Herein:

FIG. 1 shows in a schematic view a repeater system in a mobile environment of a train in communication with outside communication sources in the shape of base stations;

FIG. 2 a schematic view of an embodiment of a repeater system;

FIG. 3A a schematic view of frequency bands of communication links of outside communication sources;

FIG. 3B a schematic view of frequency bands of a communication signal transmitted into a coverage area of the repeater system;

FIG. 4 a schematic view of another example of frequency bands of a communication signal transmitted into the coverage area of the repeater system; and FIG. 5 a schematic view of an embodiment of a repeater system connected with multiple different outside communication sources.

FIG. 1 shows in a schematic view a setup of a repeater system 1 on a train 2, the repeater system 1 being in communication connection with outside communication sources 3, 4 in the shape of base stations. The repeater system 1 herein serves to provide coverage in a coverage area 20 on the inside of the train 2 and, for this purpose, is constituted to translate communication links 30, 40 into a communication signal to be distributed in the coverage area 20.

An embodiment of such a repeater system 1 is schematically shown in FIG. 2. The repeater system 1 comprises a front end section 10 having an antenna 100 and an RF processing unit 101 for receiving RF signals from and transmitting RF signals 2 to outside communication sources 3, 4 via RF communication links 30, 40. In the particular example of FIG. 2 the repeater system 1 is set up to communicate with the outside communication sources 3, 4 via the air, i.e. wirelessly by means of RF signals.

The repeater system 1 further comprises a back end section in the shape of one or multiple remote units 13, 14 being in communication connection with the front end section 10 and serving to provide coverage in the coverage area 20. The remote units 13, 14 comprise antennas 135, 143 for establishing communication links 50, 60 to terminals 5, 6 located in the coverage area 20.

The repeater system 1 provides a local roaming cell corresponding to the coverage area 20. For this, instead of retransmitting the same kind of signals that have been received via communication links 30, 40 from outside sources 3, 4 into the coverage area 20, the available capacity of communication links 30, 40 is aggregated to form a common RF communication signal for transmission into the coverage area 20 via the remote units 13, 14. This common RF communication signal, potentially having a unique identifier, is distributed within the coverage area 20 such that a combined common RF communication signal is radiated into the coverage area 20.

For this, in a downlink direction signals of communication links 30, 40 are received via antenna 100 and RF processing unit 101 at the front end section 10. The RF processing unit 101 herein serves to perform a filtering and amplification of incoming RF signals and to forward such signals to a conversion and link aggregation unit 102.

In the conversion and link aggregation unit 102 the signals associated with the communication links 30, 40 are demodulated, converted and combined to obtain, by means of link aggregation, a combined signal which, essentially, is represented by the pure data contained in the signals of the communication links 30, 40. Such combined signal is then provided to the one or multiple remote units 13, 14.

In the depicted embodiment the front end section 10 is constituted as a host unit, which for example may be located at a central location of a shielded or isolated environment such as train 2. From the front end section 10 in the shape of the host unit the combined signal is transmitted to one or multiple remote units 13, 14 (together forming the back end section), wherein multiple remote units 13, 14 may be distributed throughout the shielded or isolated environment such as train 2 for providing distributed coverage in the coverage area 20.

In principle, different possibilities for establishing a connection between the front end section 10 in the shape of the host unit and the remote units 13, 14 of the back end section are conceivable.

In a first example, shown in FIG. 2 on the left, the conversion and link aggregation unit 102 of the front end section 10 may provide the combined signal to a wireless communication unit 103 for establishing a wireless connection 11 to a wireless communication unit 131 of an associated remote unit 13. The wireless communication link 11 herein may be a WiFi link, wherein signals are wirelessly transmitted between antennas 104, 130 of the host unit of the front end section 10 on the one hand and the remote unit 13 of the back end section on the other hand.

Via the wireless communication unit 103 of the front end section 10 multiple remote units 13 may be connected to the host unit of the front end section 10.

In a second example, the host unit of the front end section 10 may be connected to one or multiple remote units 14 by means of one or multiple wire line communication connections 12. For this, the conversion and link aggregation unit 102 of the front end section 10, via a connection 106, provides the combined signal to a splitter 105 of the front end section 10, via which the combined signal is split and via wire line communication connections 12 distributed to one or multiple remote units 14.

In this regard, different kinds of remote units 13, 14 can be used in a repeater system 1 in a combined fashion. A repeater system 1 hence may comprise both remote units 13 being in wireless connection with the host unit of the front end section 10 and remote units 14 being in wired connection with the host unit of the front end section 10.

Independent of the specific connection of a remote unit 13, 14 to the host unit of the front end section 10, the remote unit 13, 14 comprises a splitter 132, 140 for splitting the incoming combined signal to multiple base stations 133a-133d, 141a-141d. Such base stations 133a-133d, 141a-141d, which may be implemented on a single chip within a remote unit 13, 14, modulate portions of the incoming combined signal according to a predefined modulation schemes. The modulated signals provided by the base stations 133a-133d, 141a-141d are then forwarded to a multiplexer 134, 142, which combines the modulated signals to form a common RF communication signal. The common RF communication signal is then transmitted via one or multiple antennas 135, 143, which for example may be set up as a distributed antenna system or a so called leaky feeder for providing distributed coverage throughout the coverage area 20.

The repeater system 1 hence is set up to combine (aggregate) communication links 30, 40 established with outside communication sources 3, 4 to obtain a combined signal and to transmit the combined signal as a common RF communication signal into the coverage area 20. The communication links contained in that RF communication signal transmitted into the coverage area 20 herein may be of a different kind than the outside communication links 30, 40. In particular, the common RF communication signal transmitted into the coverage area 20 may employ different modulation schemes and may cover one or multiple different frequency bands.

This is shown in an example in FIGS. 3A and 3B. Herein FIG. 3A shows frequency bands of communication links 30, 40 established between outside communication sources 3, 4 and the front end section 10 of the repeater system 1. FIG. 3B, in turn, shows frequency bands covered by the common RF communication signal which is to be transmitted into the coverage area 20 by means of the remote units 13, 14 of the back end section.

In the particular example, the signals of the communication links 30, 40 lie in the frequency bands of LTE 800 (between 791 MHz und 821 MHz),
GSM 900 (between 925 MHz and 960 MHz),
LTE 1800 (between 1805 MHz und 1880 MHz),
UMTS 2100 (between 2110 MHz und 2170 MHz) and
WiFi 2.4G (between 2.4 GHz and 2,4835 GHz).

Precisely, a first operator may be assigned one LTE 800 carrier having a band width of 10 MHz, a second operator may be assigned three UNITS 900 carriers each having a band width of 5 MHz, the first operator in addition may be assigned eight GSM 900 carriers each having a band width of 200 kHz, a third operator may be assigned one LTE 1800 carrier having a band width of 20 MHz, the first operator may be additionally assigned one LTE 1800 carrier having a band width of 20 MHz, and a fourth operator may be assigned a UMTS 2100 carrier having a band width of 15 MHz. In addition a single WiFi 2.4G 40 MHz carrier is present.

Such communication links 30, 40 hence represent data links for transmitting data (e.g. LTE, UMTS, WiFi) or voice call links for transmitting speech data (e.g. GSM). Such communication links 30, 40 are, in the front end section 10, converted and combined to form a combined signal containing the data contained in the single communication links 30, 40.

Such combined signal is forwarded, in the downlink direction, to the remote units 13, 14, which modulate by means of their base stations 133a-133d, 141a-141d the combined signal to provide a local communication cell in the coverage area 20 employing, in the example of FIG. 3B, the schemes of LTE 2.6 (in a frequency band between 2620 MHz and 2680 MHz), LTE3.5 (in a frequency band between 3510 MHz and 3590 MHz) and WiFi 5G (in a frequency band between 5.15 GHz and 5.85 GHz).

In the particular example, data and speech carriers in the frequency bands of the communication links 30, 40 with the outside communication sources 3, 4 hence are translated into two LTE 2.6 carriers having of a band width of 20 MHz each, two LTE 3.5 carriers having a band width of 20 MHz each, and one WiFi 5G carrier having a band width of 40 MHz. The signals of such carriers are combined by a multiplexer 134, 142 and transmitted as a common RF communication signal into the coverage area 20 for reception by one or multiple terminals 5, 6 located in the coverage area 20.

Terminals 5, 6 located in the coverage area 20 may for example be mobile phones, such as smartphones, or portable computer devices, such as laptop or tablet computers. Herein, in the particular example given in FIG. 3B, via the LTE 2.6 and LTE 3.5 carriers in particular mobile phones may establish a connection to the repeater system 1, whereas computer devices, such as laptops or tablets, may communicate with the repeater system 1 via the WiFi carrier (with an appropriate chip set or USB dongle it may also be possible for laptops or tablets to communicate via the LTE carriers).

The carriers of the outside communication links 30, 40 may belong to different operators. By means of the repeater system 1 the signals of such carriers are combined to an RF communication signal common to all operators such that a user may communicate with the repeater system 1 and via the repeater system 1 with outside communication sources 3, 4 substantially independent on the communication capacity of a particular operator the user has subscribed with.

In the example of FIGS. 3A and 3B, the frequency bands of the outside communication links 30, 40 and the local roaming cell in the coverage area 20 are different from each other. It however is also possible, as shown in FIG. 4, that the frequency bands of the outside communication links 30, 40 and the common RF communication signal in the coverage area 20 partially or fully overlap.

In the particular example of FIG. 4, the communication signal is transmitted into the coverage area 20 via GSM/LTE 1800 carriers in the frequency band of 1805 MHz to 1880 MHz, via UMTS 2100 carriers in the frequency band of 2110 and 2170 MHz and via a WiFi 2.4G carrier in the frequency band between 2.4 GHz and 2.4835 GHz. Precisely, eight GSM 1800 carriers having a band width of 200 kHz each, two LTE 1800 carriers having a band width of 20 MHz each, three UMTS 2100 carriers having a band width of 15 MHz each, and one WiFi 2.4G carrier having a band width of 40 MHz are employed. Such frequency bands are at least in a partial match with a subset of the frequency bands of the outside communication links 30, 40 as shown in FIG. 3A.

In this case, interference will not be a problem if the coverage area 20 of the common RF communication signal transmitted by the remote units 13, 14 lies in an isolated, shielded environment.

If however the environment of the coverage area 20 is not fully shielded, it is to be made sure that the signal strength of the RF communication signal transmitted into the coverage area 20 is limited in order not to interfere with outside signals. This in general poses no problem since for example passengers in a train 2 usually are seated close to antennas or leaky feeder cables, such that an RF communication signal of limited signal strength in general is sufficient.

In the above description it primarily has been referred to the downlink in the direction from outside communication sources 3, 4 to terminals 5, 6 located in the coverage area 20. The uplink works essentially in an opposite fashion in that in the uplink direction in the remote units 13, 14 a combined signal is produced and forwarded to the front end section 10, and the conversion and link aggregation unit 102 of the front end section 10 translates the combined signal into signals for the different outside communication links 30, 40. The RF processing unit 101 then transmits, via antenna 100, corresponding RF signals to the communication sources 3, 4.

In the example of FIGS. 1 to 4, outside communication sources 3, 4 communicate via an air interface with the repeater system 1. This in particular is applicable for moving environments such as trains, planes, ships or vehicles such as busses. A repeater system 1 of the kind described herein however may also be used in stationary environments such as in buildings or tunnels for providing coverage in isolated areas of such environments.

For such stationary environments it is also conceivable, as shown in an embodiment in FIG. 5, that the repeater system 1 via a backhaul 96 is directly connected to outside communication sources 9 of communication networks. For example, via backhaul 96 the front end section 10 of the repeater system 1 may be connected to a communication source providing E1/T1 services 90, to a communication source providing DSL services 91, to a passive optical network (PON) 92, to an active optical Ethernet 93, to a free-space optical communication network 94, or to a fixed wireless communication link 95. Via such backhaul 96 data may, in the digital baseband, be provided directly to the conversion and link aggregation unit 102.

Further, a communication source 8 in the shape of a base station may be connected via a so called Common Public Radio Interface (CPRI) to the conversion and link aggregation unit 102 of the front end section 10.

In addition, a communication source 7 may via an RF cable be connected to the RF processing unit 101, hence providing RF signals in the RF frequency band to the RF processing unit.

By means of the conversion and link aggregation unit 102 such different signals are combined to a single combined signal containing the data comprised in the several communication links. The distribution of the communication data stream within the coverage area 20 takes place similarly as described above.

The idea underlying the invention is not limited to the embodiments described above, but may be implemented in an entirely different fashion in completely other solutions.

In particular, a repeater system of the noted kind may operate in entirely different environments than the ones stated above. Further, entirely different modulation schemes and/or frequency bands may be employed other than the ones mentioned in this text.

LIST OF REFERENCE NUMERALS

1 Repeater system
10 Front end section (host unit)
100 Antenna
101 RF processing unit 102 Conversion and link aggregation unit
103 Wireless communication unit
104 Antenna
105 Splitter
106 Connection line
11 Wireless communication connection
12 Wire line communication connection
13 Back end section (remote unit)
130 Antenna
131 Wireless communication unit
132 Splitter
133a-133c Remote base station
133d WiFi hub
134 Multiplexer
135 Antenna port
14 Back end section (remote unit)
140 Splitter
141a-141c Remote base station
141d WiFi hub
142 Multiplexer
143 Antenna port
2 Train
20 Coverage area
3, 4 Base station
30, 40 Communication link
5, 6 Terminal
50, 60 Communication link
7, 8 Base station
9 Signal sources
90-95 Signal source
96 Backhaul

What is claimed is:

1. A repeater system located within a coverage area, the repeater system comprising:
a host unit configured to combine multiple downlink signals from multiple communication sources located outside the coverage area into a first combined downlink signal;
at least one remote unit coupled to the host unit and configured to transmit the first combined downlink signal as a second downlink RF communication signal into the coverage area to a plurality of user terminals located within the coverage area;
wherein the at least one remote unit is further configured to produce a combined uplink signal from multiple uplink signals received through multiple communication links from the plurality of user terminals located within the coverage area, and further configured to forward the combined uplink signal to the host unit;
wherein the host unit is configured to produce multiple signals from the combined uplink signal for transmission to the multiple communication sources;
wherein a first of the plurality of user terminals communicates with a different one of the multiple communication sources than a second of the plurality of user terminals.

2. The repeater system of claim 1, wherein the host unit comprises a converter and link aggregator configured to combine the plurality of downlink signals from the multiple communication sources into the combined downlink signal.

3. The repeater system of claim 2, wherein the converter and link aggregator is further configured to produce the plurality of uplink signals and modulate the plurality of uplink signals for transmission to the multiple communication sources.

4. The repeater system of claim 3, wherein the host unit further comprises an RF processor, communicatively coupled to the converter and link aggregator, the RF processor configured to equalize the plurality of downlink signals received from the multiple communication sources, and individually gain adjust the plurality of uplink signals for transmission to the multiple communication sources.

5. The repeater system of claim 1, wherein the at least one remote unit further comprises:
a plurality of base stations each configured to receive the combined downlink signal from the host unit and modulate a portion of the combined downlink signal according to at least one modulation scheme to produce an RF communication signal; and
a multiplexer that combines the RF communication signal from each of the plurality of base stations to form the second downlink RF communication signal for transmission into the coverage area.

6. The repeater system of claim 1, wherein the host unit is configured to communicate with multiple communication sources over an air interface.

7. The repeater system of claim 1, wherein the host unit is configured to communicate with the multiple communication sources via a mobile communication scheme.

8. The repeater system of claim 7, wherein the mobile communication scheme is at least one of GSM, GPRS, 3G, HSPA, HSPA+, LTE, and WiFi.

9. The repeater system of claim 1, wherein the host unit is configured to communicate with the multiple communication sources each via a different respective mobile communication scheme.

10. The repeater system of claim 1, wherein the host unit is configured to communicate with at least one of the multiple communication sources via a backhaul.

11. The repeater system of claim 1, wherein a first modulation scheme of the multiple downlink signals received from the multiple communication sources is different than a second modulation scheme of the second downlink RF communication signal transmitted into the coverage area.

12. The repeater system of claim 1, wherein a modulation scheme of the second downlink RF communication signal transmitted into the coverage area comprises is at least one of GSM, GPRS, 3G, HSPA, HSPA+, LTE, and WiFi.

13. The repeater system of claim 1, wherein the second downlink RF communication signal transmitted into the coverage area comprises at least two different modulation schemes.

14. The repeater system of claim 1, wherein the multiple downlink signals from multiple communication sources and the second combined downlink signal operate in different frequency bands.

15. The repeater system of claim 1, wherein the combined uplink signal and the multiple uplink signals operate in different frequency bands.

16. A method, comprising:
receiving, at a host unit, a plurality of downlink signals from multiple communication sources located outside of a coverage area, wherein the host unit is configured to combine plurality of downlink signals from multiple communication sources into a first combined downlink signal for transmission to one or more remote units;
transmitting from each of the one or more remote units a second combined downlink RF communication signal into the coverage area to a plurality of user terminals located within the coverage area, wherein the second downlink RF communication signal is produced from the first combined downlink signal;

producing at each of the one or more remote units a combined uplink signal from multiple uplink signals received through multiple communication links from the plurality of user terminals located within the coverage area;

transmitting a plurality of uplink signals from the combined uplink signal for transmission to the multiple communication sources;

wherein a first of the plurality of user terminals communicates with a different one of the multiple communication sources than a second of the plurality of user terminals.

17. The method of claim 16, wherein the one or more remote units are each configured for:

receiving the combined downlink signal from the host unit and modulating a portion of the combined downlink signal according to at least one modulation scheme to produce multiple modulated signals;

multiplexing the multiple modulated signals to form the second downlink RF communication signal for transmission into the coverage area.

18. The method of claim 16, wherein the second downlink RF communication signal transmitted into the coverage area comprises at least two different mobile modulation schemes.

19. The method of claim 16, wherein the host unit is configured to communicate with the multiple communication sources each via a different respective mobile communication scheme.

20. The method of claim 16, wherein the host unit is configured to communicate with at least one of the multiple communication sources via a backhaul.

* * * * *